(12) United States Patent
Cahn

(10) Patent No.: US 6,857,104 B1
(45) Date of Patent: Feb. 15, 2005

(54) ORGANIZING GRAPHICAL USER INTERFACES TO REVEAL HIDDEN AREAS

(75) Inventor: Robert Cahn, Carmel, NY (US)

(73) Assignee: AT&T Corp, New York, NY (US)

( * ) Notice: Subject to any disclaimer, the term of this patent is extended or adjusted under 35 U.S.C. 154(b) by 545 days.

(21) Appl. No.: 09/982,076

(22) Filed: Oct. 17, 2001

(51) Int. Cl.$^7$ ................................................ G06F 3/00
(52) U.S. Cl. .................... 715/810; 715/168; 715/172; 715/764; 715/847; 715/902
(58) Field of Search ..................... 345/168, 172, 345/762, 764, 765, 808, 810, 835, 846, 847, 902

(56) References Cited

U.S. PATENT DOCUMENTS

| | | | | |
|---|---|---|---|---|
| 5,504,852 A | * | 4/1996 | Thompson-Rohrlich | .... 345/835 |
| 5,706,458 A | * | 1/1998 | Koppolu | ..................... 345/810 |
| 6,175,364 B1 | * | 1/2001 | Wong et al. | ................. 345/763 |
| 6,252,597 B1 | * | 6/2001 | Lokuge | ....................... 345/841 |
| 6,307,549 B1 | * | 10/2001 | King et al. | ................. 345/810 |
| 6,621,532 B1 | * | 9/2003 | Mandt | ......................... 348/841 |
| 2001/0056434 A1 | * | 12/2001 | Kaplan et al. | ........... 707/104.1 |
| 2003/0050967 A1 | * | 3/2003 | Bentley | ....................... 709/203 |

FOREIGN PATENT DOCUMENTS

| | | | | |
|---|---|---|---|---|
| JP | 02226329 A | * | 9/1990 | ............. G06F/3/14 |
| JP | 07210356 A | * | 8/1995 | ............. G06F/3/14 |
| WO | WO 0152103 A1 | * | 7/2001 | ........... G06F/17/24 |

OTHER PUBLICATIONS

"The Guided Tour of Windows Whistler Beta 1", Nov. 2000, Magazine Journal, WinMag.com.*
Antonino N. Mione, "Crafting FileView and Session Manager commands", May 1995, Digital Systems Journal, v17, n3, p10(5).*
Carlos Domingo Martinez, "Reviews: Dabbler 2", Mar. 1996, Macworld, v13, n3, p63.*
Ben Long, "Painter 3 mimics real–world art", Dec. 1994, MacWee, v8, n48, p1(3).*

* cited by examiner

Primary Examiner—X. L. Bautista

(57) ABSTRACT

Graphical user interfaces (GUIs) that display hidden software options to a user. The GUIs described herein contain an instrumentality, for example an icon, which a user can activate which produces a separate drop down menu that lists at least some of the options that may be hidden to the user, but that are available. This removes the need for the user to search through the software or manuals for the software to determine where the options may be found if not visually apparent on the GUI.

12 Claims, 4 Drawing Sheets

ORGANIZING GRAPHICAL USER INTERFACES TO REVEAL HIDDEN AREAS

BACKGROUND OF THE INVENTION

1. Field of the Invention

This invention relates generally to the use and production of graphical user interfaces. More specifically, the invention relates to methods for arranging graphical user interfaces to reveal menus and other hidden areas which are not readily apparent to a user.

2. Description of the Related Art

As computers have become more sophisticated over the years, user interfaces to the computers and software that is run on the computers have also become more advanced. Graphical user interfaces (GUI) in particular have become very popular in providing users of computers, and particularly mouse input devices, with access to software, including menus for software options. GUIs are often provided in color, and color indications have long been used to indicate to users of GUIs what the particular state of a software function may be, and how to change these states.

In GUI systems, objects often have different methods that can be invoked using a "pull-down" menu. While the use of pull-down menus have been considered by those skilled in the art as logical and clear methods for displaying software menus, there are often hidden areas in the screen or choices that the user simply doesn't stumble across when attempting to manipulate the GUI to invoke the full scope of the software's functionality. Therefore, GUIs with hidden or masked option menus simply do not provide users with enough information to allow all of the versatility of a software program to be readily apparent and so oftentimes the software is not used to its fullest potential.

FIG. 1 illustrates a prior GUI 10 which exhibits some of the aforementioned problems in the art. Besides a menu bar 20 on GUI 10 on which the user might look for the different drop down menus that allow options for the software to be invoked, this GUI comprises three "option areas" 30, 40, 50 wherein a user of GUI 10 might click to access options. For example, option area 30 might comprise options for printing, saving, querying, or updating. Option area 40 might comprise options for printing, updating or resyncing with a host. Option area 50 might comprise options for printing, querying, or sending a document or data to a remote user. It will be appreciated by those with skill in the art that many other options for manipulating data and software may appear in a GUI such as that shown at 10 in FIG. 1, and many types of software programs and/or regimes may employ such GUIs.

It will be further appreciated that a GUI 10 of the type shown in FIG. 1 may be very poorly designed, especially with respect to option area 50 which is just a small sliver of the entire GUI window, or the display may be a size in pixels such that option area 50 is barely visible. Suppose that it is desired to invoke the option "send to a remote user" which is available in the option area 50. Since option area 50 is almost completely obscured in the current GUI 10 configuration, indeed the entire option area 50 could be scrolled entirely off of the window, the user may not be able to visually find this function. This results in the user spending a large amount of wasted time trying to find the option. This might include reading manuals, which are often cumbersome and inconclusive, or calling help desks to try and figure out where the option is or what might be the problem with the GUI 110.

Referring now to FIG. 2, when the user attempts to resize the window in its hunt for the correct option, option area 30 has been greatly reduced in size, option are 40 has been reduced to nothing more than a sliver of the window, and option area 50 has totally disappeared. Therefore, in attempting to find the desired option by simply resizing the window, the user has completely lost the ability to find the option, and the GUI 110 is of no use in providing functional options to the user.

There is therefore a long-felt need in the art for methods of organizing GUIs so that software options and functions are readily apparent and easily findable. The methods of the present invention should be readily adaptable to all types of software which utilize drop-down menus and other graphical displays for option picking. Moreover, the GUIs produced by the present invention should be easy to manipulate and operable for use with standard input devices such as a mouse or touch-sensitive capacitive pad. Such needs have not heretofore been fulfilled in the art.

SUMMARY OF THE INVENTION

The aforementioned long-felt needs are met, and problems solved, by GUIs of the present invention. Preferably, the GUIs comprise at least one option area for displaying to a user functions which may be invoked by the user by operating an input device to the GUI. Even more preferably, an instrumentality is operable to be activated by the user when the user manipulates the input device for displaying at the user's command in a separate menu the functions that are displayable to the user in the at least one option area.

It will be appreciated that the instrumentality may comprise, for example, an icon that is visually displayed on the GUI or is otherwise conveniently viewed by the user when the user wishes to display the options in the separate menu. Alternatively, a series or combination of keystrokes that are enterable from a computer keyboard may be made operable to enable display of the separate menu with the options at the request of the user.

Additionally, the input device may be a mouse or other tactile device such as a capacitive touch pad. However, it will be appreciated that other input devices, for example, voice-activated input devices may also be used in conjunction with the present invention to accept input commands from the user. All such embodiments and equivalents thereof are intended to be within the scope of the present invention.

The present invention allows GUIs to function efficiently and expeditiously for users that are in need of invoking any software function that is offered by the software package. The inventive GUIs eliminate the need for users to unnecessarily search for and find hidden functions, thereby preventing the user from being distracted from the task at hand. Moreover, the GUIs described and claimed herein allow software packages to be used to their fullest capabilities and also widen the spectrum of users that will be able to utilize these capabilities since even a relatively inexperienced GUI operator will have the ability to gain access to all of the software's functionality very easily. These results have not heretofore been achieved in the art.

These and other features, objects and benefits of the invention will be best understood by those skilled in the art by reading the following detailed description of the invention in conjunction with the drawings which are first described briefly below.

BRIEF DESCRIPTION OF THE DRAWINGS

In the drawings wherein like reference numerals refer to like elements throughout the several views hereof.

DETAILED DESCRIPTION OF THE PREFERRED EMBODIMENTS

Figure 3:
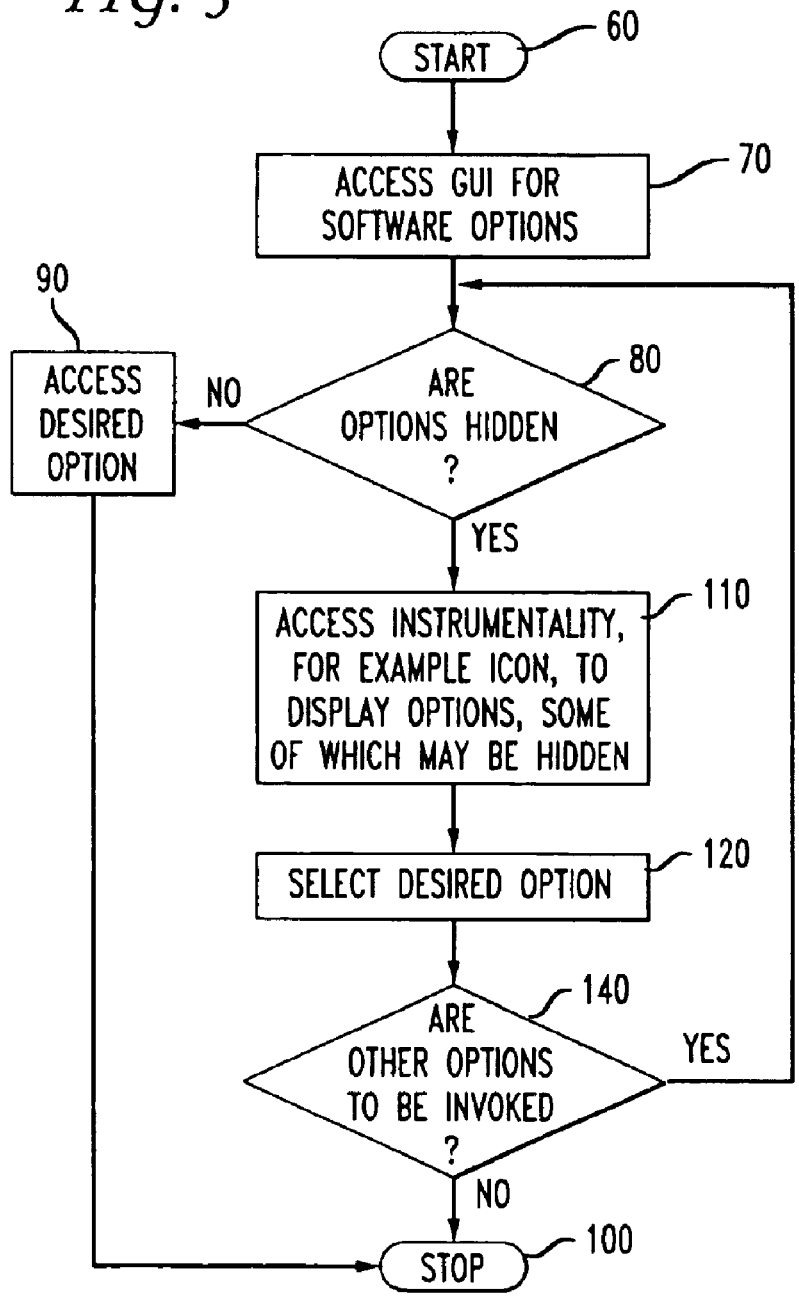
FIG. 3 is a flow chart of a preferred method of the present invention wherein hidden options may be accessed by a user.

Referring now to FIG. 3, a flow chart of preferred methods for providing GUIs in accordance with the present invention is illustrated. It will be appreciated by those with skill in the art that the inventive GUIs will be programmed in an appropriate software language and run on a computer or server. The GUIs may be written in any software language such as C++, JAVA, Visual Basic, HTML, UNIX, or other, preferably object-oriented, language. The GUIs will be manipulatable by a user of the software using an input device, such as a mouse, touch sensitive pad, or other mechanism.

The preferred methods begin at step 60, and at step 70 a user attempts to access the inventive GUI for invocation of software options that the user desires to use. It is then determined at step 80 whether the options are hidden from the user on the GUI. If the options are not hidden, then the method progresses to step 90 and the user accesses the desired option so that the particular software functionality can be invoked. Alternatively, even if all of the menu or option areas are visible, it may still be desirable to put up the menu of FIG. 5 since it may be poorly designed or otherwise hidden by another element on the screen, for example. The method then stops at step 100.

However, if the options are indeed hidden from the user, or the user cannot otherwise find the particular option that it desires to invoke, or if it is otherwise desirable to up the menu, then the method progresses to step 110 wherein the user accesses an instrumentality of the GUI (to be described in more detail below) to display at least a partial list of the options invocable for the software, some of which may have been hidden from the user in the GUI for one reason or another. The hidden options may be displayed to the user after the user accesses the GUI instrumentality in a variety of ways. For example, but not intending to limit the invention in any way, a separate menu of all of the options available to the user, hidden or not, may be displayed to the user after the instrumentality is invoked so that the user may then see all of the options on the menu and pick the desired option therefrom. Alternatively, an option tree structure in the form of bullets may appear, or a folder/subfolder arrangement may be displayed having all of the options thereon for display to the user. All such arrangements and equivalents thereof are intended to be within the scope of the present invention.

Regardless of how the hidden options are displayed to the user, at step 120 the user selects from the displayed list of hidden options in the GUI, the desired option which the user wishes to invoke. This software function is then conventionally performed, and at step 140 the user determines whether there are other software options which it desires to be invoked. If not, then the method stops at step 100. If so, then the method returns to step 80 where it is determined whether the options are hidden, and the process repeats.

In this fashion, the GUIs of the present invention always make readily available to the user all of the allowed software options that a user may desire to invoke when operating the GUI and the software. This allows the users fast access to the options without having to first search throughout all of the option areas of a GUM for the desired option or options to be invoked. The inventive GUIs thereby allow a user to operate the software very quickly and efficiently while alleviating any frustration that a user my experience searching for options. These results have not heretofore been achieved in the art.

Figure 1:
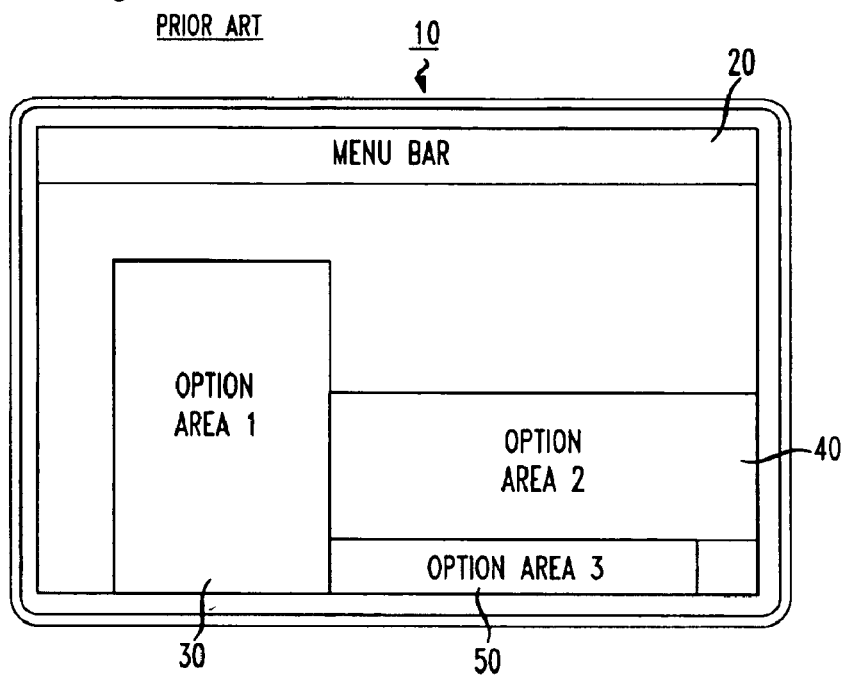
FIG. 1 is a view of a prior art GUI having various option areas which may be activated by a user to invoke software functionality.
Figure 2:
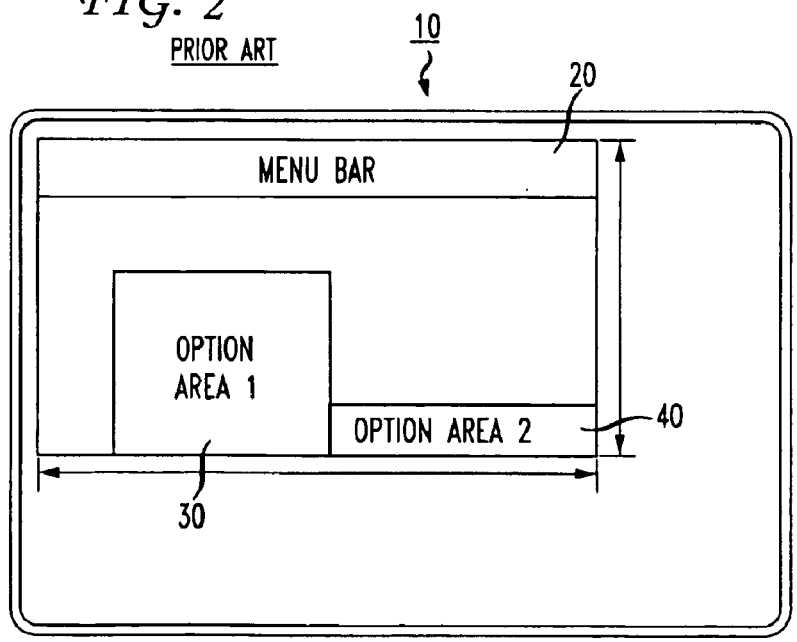
FIG. 2 is a view of the GUI of FIG. 1 wherein the option areas have been re-sized.
Figure 4:
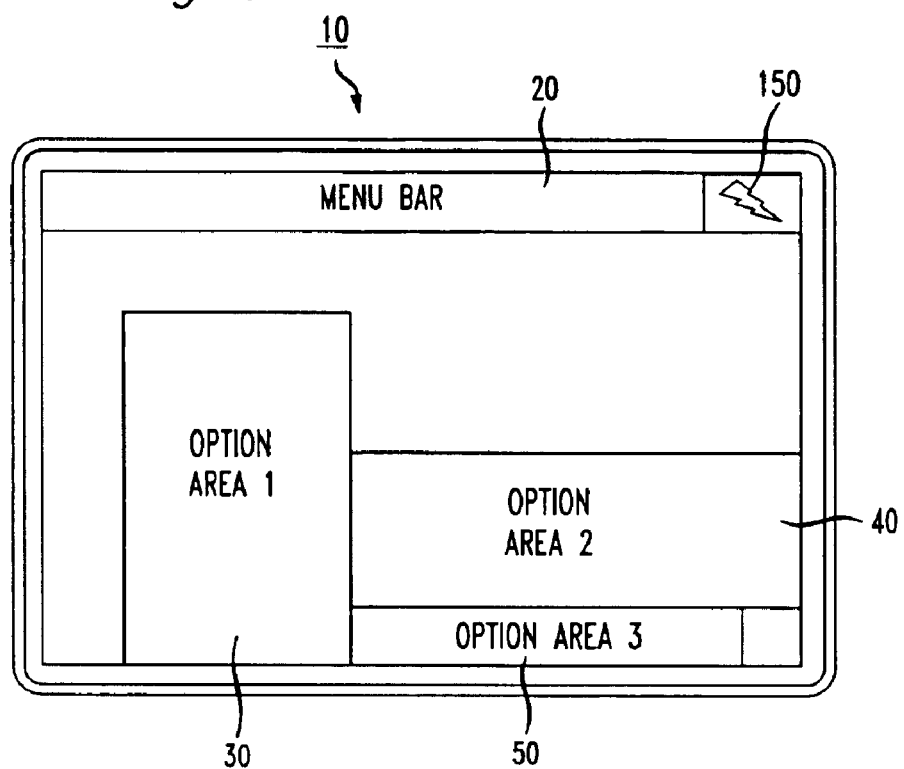
FIG. 4 is a view of a GUI provided in accordance with the present invention.

FIG. 4 illustrates an inventive GUI which is similar in form to the prior GUIs of FIGS. 1 and 2 in that the same three option areas 30, 40, 50 are extant. In accordance with the invention, an instrumentality 150 is provided to the GUI which will allow the user to display the options which are available in any one, or all, or the option areas 30, 40 SO, preferably by a single mouse click. In the preferred embodiment, instrumentality 150 is an icon in the form of a lightning bolt. It will be appreciated that the icon could take any form and may be placed in the GUI at any place that is conspicuous to the user. Alternatively, a unique combination or sequence of keystrokes could be used as the instrumentality, for example, Ctrl-Shift-F1.

Figure 5:
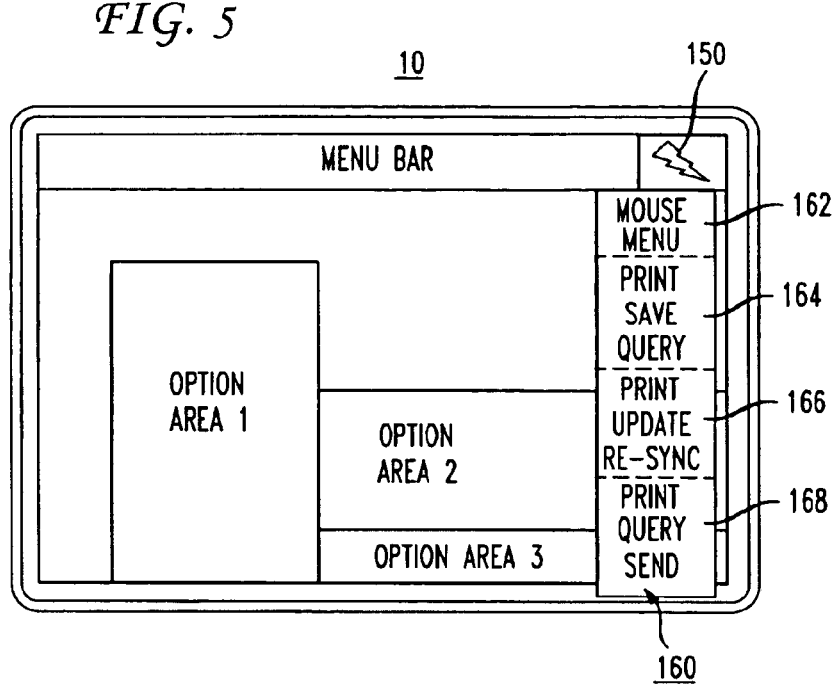
FIG. 5 is a view of the GUI of FIG. 4 having a separate menu that has been accessed by a user and which displays software options.

Whatever form the instrumentality takes, FIG. 5 illustrate that in accordance with the invention when instrumentality 150 is invoked by the user by clicking on the icon or otherwise enabling the instrumentality, a separate menu 160 appears which in this embodiment displays all of the allowed options that a user might wish to invoke. It will be appreciated by those with skill in the art that other than all of the allowed options may be displayed, for example, only those options that are not visually present on the GUI may be displayed on menu 160. Moreover, a list of all options available on the GUI as well as those not found on the GUI but which are only in other drop-down menus may be displayed on separate menu 160. Additionally, other than a separate menu 160 may be provided to display all of the options. For example, a tree structure having the different options marked by bullets that can be clicked on to open the options may be employed, or a folder/subfolder arrangement may be provided which classifies the options into different types for storage in the folders and subfolders to be accessed therefrom.

As can be seen, in the embodiment of FIG. 5 menu 160 comprises four separate areas corresponding to different software options available to the user. A first area 162 displays options that are not associated with option areas 30, 40, 50. Rather, first area 162 displays options relating to mouse menus which a user may access through the GUI after separate menu 160 is accessed. Area 164 displays options that correspond to those found in option area 30; print, save, query and update. Area 166 displays options that correspond to those found in option area 40; print, update and re-sync. Similarly, area 168 displays options that correspond to those found in option area 50; print, query and send. Any or all of the options displayed on menu 160 in areas 162, 164, 166, 168 may be hidden from the user through the GUI before the icon 150 is invoked, and so they only become apparent to the user when the separate menu 160 is displayed. This allows the user fast and easy access to the options without long, frustrating periods of search for the functionality provided by these options.

Figure 6:
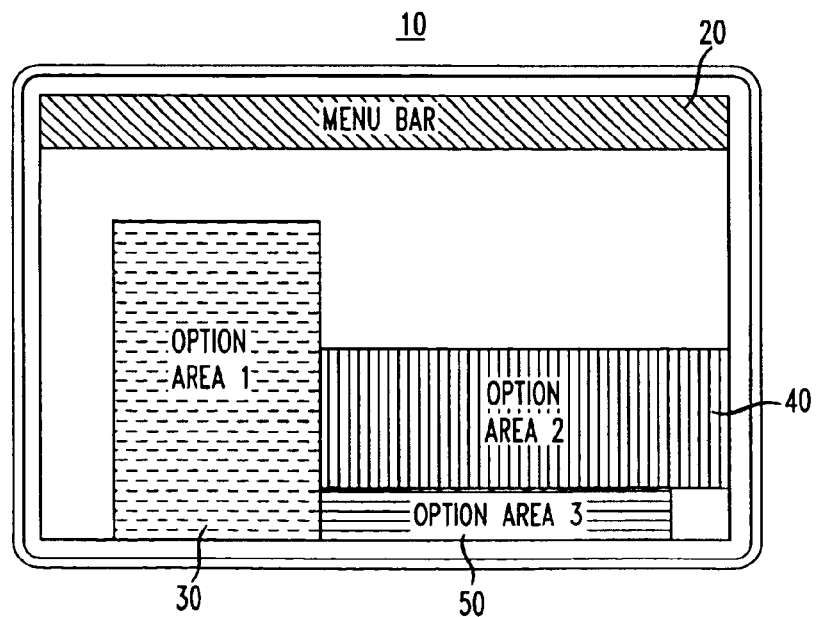
FIG. 6 is an alternative embodiment of a GUI of the present invention

FIG. 6 illustrates yet another alternative embodiment of GUIs provided in accordance with the present invention. In FIG. 6, the option areas 30, 40, 50 are made more distinct by simply shading or otherwise altering the color scheme or fill of the areas in a distinctive manner. In this fashion, the user will be better able to view the various option areas 30, 40, 50 and thereby more easily spot the options that are made available through GUI 10. In this embodiment, the instrumentality is simply a toggle of one of the keys on the keyboard, and thus no icon is present.

Thus, the present invention allows GUIs to function efficiently and expeditiously for users that are in need of invoking any software function that is offered by the software package. The inventive GUIs described and claimed herein eliminate the need for users to unnecessarily search for and find hidden functions, thereby preventing the user from being distracted from the task at hand. Moreover, the GUIs provided in accordance with the present invention allow software packages to be used to their fullest capabilities and also widen the spectrum of users that will be able to utilize these capabilities since even a relatively inexperienced GUI operator will have the ability to gain access to all of the software's functionality very easily. These results have not heretofore been achieved in the art While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A graphical user interface (GUI), comprising:
    at least one option area for displaying to a user functions which may be invoked by the user by operating an input device to the GUI; and
    an instrumentality operable to be activated by the user when the user manipulates the input device for displaying at the user's command in a separate menu the functions that are displayable to the user in the at least one option area.

2. The GUI recited in claim 1, wherein the instrumentality comprises a sequence of keystrokes.

3. The GUI recited in claim 1, wherein the instrumentality comprises an icon.

4. The GUI recited in claims 2 or 3, further comprising a separate menu which is activated by the user invoking the instrumentality and which lists options that are hidden from the users view in the option area.

5. The GUI recited in claim 1 wherein the GUI comprises a plurality of options areas.

6. The GUI recited in claim 5, wherein each of the option areas in the plurality of options areas comprises a separate color.

7. A method of providing to a user of a graphical user interface (GUI) option functions for software that is associated with the GUI, comprising the steps of:
    providing at least one option area for displaying to a user functions which may be invoked by the user by operating an input device to the GUI; and
    providing an instrumentality operable to be activated by the user when the user manipulates the input device for displaying at the user's command in a separate menu the functions that are displayable to the user in the at least one option area.

8. The method recited in claim 7, wherein the instrumentality comprises a sequence of keystrokes.

9. The method recited in claim 7, wherein the instrumentality comprises an icon.

10. The method recited in claims 8 or 9, wherein the second providing step further comprises the step of creating a separate menu which is activated by the user invoking the instrumentality and which lists options that are hidden from the user's view in the option area.

11. The method recited in claim 7 wherein the first providing step comprises providing to the user a plurality of options areas.

12. The method recited in claim 11, wherein each of the option areas in the plurality of options areas comprises a separate color.

* * * * *